United States Patent
Wiegmann

(10) Patent No.: US 12,555,875 B2
(45) Date of Patent: Feb. 17, 2026

(54) CONNECTION POLE FOR A RECHARGEABLE BATTERY AND RECHARGEABLE-BATTERY HOUSING

(71) Applicant: Clarios Advanced Solutions GmbH, Hannover (DE)

(72) Inventor: Martin Wiegmann, Borstel (DE)

(73) Assignee: Clarios Advanced Solutions GmbH, Hannover (DE)

( * ) Notice: Subject to any disclaimer, the term of this patent is extended or adjusted under 35 U.S.C. 154(b) by 396 days.

(21) Appl. No.: 16/759,019

(22) PCT Filed: Oct. 25, 2017

(86) PCT No.: PCT/EP2017/077283
§ 371 (c)(1),
(2) Date: Apr. 24, 2020

(87) PCT Pub. No.: WO2019/081007
PCT Pub. Date: May 2, 2019

(65) Prior Publication Data
US 2020/0328398 A1    Oct. 15, 2020

(51) Int. Cl.
*H01M 50/552*    (2021.01)
*H01M 10/06*    (2006.01)
(Continued)

(52) U.S. Cl.
CPC ......... *H01M 50/561* (2021.01); *H01M 10/06* (2013.01); *H01M 50/184* (2021.01);
(Continued)

(58) Field of Classification Search
CPC ...... H01M 50/05; H01M 10/06; H01M 50/17; H01M 50/561; H01M 50/172
See application file for complete search history.

(56) References Cited

U.S. PATENT DOCUMENTS 4,879,191 A    11/1989  Sindorf
7,070,441 B1    7/2006  Gregory et al.
(Continued)

FOREIGN PATENT DOCUMENTS

CN    2445439 Y    8/2001
CN    101960641 A    1/2011
(Continued)

OTHER PUBLICATIONS

International Search Report and Written Opinion of the International Searching Authority dated May 2, 2019, for PCT/EP2017/077283 filed Oct. 25, 2017, 13 pgs.

*Primary Examiner* — Matthew T Martin
*Assistant Examiner* — Grace Ann Kenlaw
(74) *Attorney, Agent, or Firm* — Boardman & Clark LLP

(57) ABSTRACT

A connection pole for a rechargeable battery. The connection pole has a connection region for securing a pole terminal to the connection pole, and a securing region for securing the connection pole to a housing part of the rechargeable battery. A circumferential projection is provided in an end region of the securing region facing towards the connection region, said projection having at least substantially an annular shape and being provided with a tooth system on its outer circumference for the purpose of prevention rotation of the connection pole. A circumferential sealing projection is provided, in the end region of the securing region facing towards the connection region, between the circumferential projection provided with the tooth system and the connection region, said sealing projection being of at least substantially circular-ring shaped design.

19 Claims, 5 Drawing Sheets

(51) Int. Cl.
*H01M 50/147* (2021.01)
*H01M 50/184* (2021.01)
*H01M 50/186* (2021.01)

(52) U.S. Cl.
CPC ....... *H01M 50/186* (2021.01); *H01M 50/552* (2021.01); *H01M 50/147* (2021.01); *H01M 2220/20* (2013.01)

(56) References Cited

U.S. PATENT DOCUMENTS

| | | | |
|---|---|---|---|
| 2001/0041286 A1 | 11/2001 | Cramer | |
| 2002/0002772 A1* | 1/2002 | Hirano | H01M 50/564 29/874 |
| 2007/0122696 A1* | 5/2007 | Richter | H01M 50/561 429/180 |
| 2008/0241677 A1* | 10/2008 | Garcia Alberola | H01M 50/172 429/181 |
| 2010/0291435 A1* | 11/2010 | Garin | H01M 50/184 29/623.1 |
| 2011/0014513 A1* | 1/2011 | Lange | H01M 50/561 429/185 |
| 2011/0262806 A1* | 10/2011 | Balzan | H01M 50/184 429/211 |
| 2013/0052519 A1* | 2/2013 | Streuer | H01M 50/561 429/178 |

FOREIGN PATENT DOCUMENTS

| | | | | |
|---|---|---|---|---|
| CN | 102859745 A | | 1/2013 | |
| CN | 103840098 A | | 4/2014 | |
| CN | 104685662 A | | 6/2015 | |
| DE | 603 15 088 T2 | | 4/2008 | |
| DE | 10 2012 111409 A1 | | 6/2014 | |
| DE | 10 2005 063540 B4 | | 10/2015 | |
| EP | 0 601 268 A1 | | 6/1994 | |
| EP | 1347522 B1 | * | 7/2007 | ............. H01M 2/06 |
| JP | 2010177089 A | | 8/2010 | |
| JP | 2010238552 A | * | 10/2010 | |
| KR | 10-1544805 B1 | | 8/2015 | |

* cited by examiner

CONNECTION POLE FOR A RECHARGEABLE BATTERY AND RECHARGEABLE-BATTERY HOUSING

CROSS REFERENCE TO RELATED APPLICATIONS

This application is a national phase filing of International Patent Application No. PCT/EP2017/077283, entitled "Connection Pole for a Rechargeable Battery and Rechargeable-Battery Housing", which has an international filing date of Oct. 25, 2017, the entirety of which is incorporated by reference for all purposes.

The present invention relates to a connection pole for a rechargeable battery and to a rechargeable-battery housing. The invention furthermore relates to a plastic battery cover for closing a battery housing, having a lower side, which faces into the battery housing in the state in which it is mounted on the battery housing, and an opposite upper side, and having at least one metal connection pole passed through the battery cover. Moreover, the invention relates to a lead-acid battery having a plastic housing divided into cells, a multiplicity of electrode plates in the cells of the plastic housing, and having electrolyte in the cells.

In the production of batteries, especially rechargeable batteries and, in this context, especially starter batteries, the formation of leadthroughs, e.g. for pole connections and cell connectors, that are leaktight and remain leaktight represents a particular problem. The leadthroughs must be inexpensive and simple to produce and must be able to withstand the electrolyte, which is highly susceptible to creep. For this purpose, lead bushings are generally pressed or molded as pole leadthroughs into the battery cover or into the cell walls.

Despite different thermal expansion coefficients of metal and plastic, firm seating must be ensured here. Further problems due to the presence of acid in and during battery production are added to this.

The previously used connection poles are generally embodied as lead bushings, which are cold-rolled, cast in molds or injection molded. The necessary safeguards against twisting or anchorages to counteract removal from the cover are provided by projections and labyrinths. At the same time, improved sealing by extension of the creep distances for the electrolyte is targeted by a larger or smaller number of labyrinth rings.

WO 2014/198650 A1 discloses a pole leadthrough of this kind in the form of a lead bushing with labyrinth rings, for example, wherein an anti-rotation safeguard is furthermore provided.

In practice, however, it has been found that, even with this pole bushing known from the prior art, it is not possible to prevent gaps in the μm range occurring to a locally limited extent between the pole bushing and the battery cover during the manufacture of the battery, into which gaps acid penetrates during battery manufacture and remains in these gaps despite the most intense efforts at cleaning. In the course of time, this causes known damage phenomena due to corrosion.

To this end, it is indispensable in the prior art to achieve an improvement in sealing by coating the outer surface of the connection pole, e.g. with silicate grease or bitumen. A lubricant seal, which simultaneously protects the lead bushings against corrosion, is thus created.

With such a type of seal, however, the firm seating of the lead bushings is diminished. Moreover, the processing of such lead bushings is complex, and the molds are contaminated. Defects, e.g. cracks, can arise in the surrounding material owing to detachment of parts of the coating.

Even the treatment of the connection pole surface by sandblasting or some other method of roughening has not led to any significant improvements hitherto.

On the basis of this problem scenario, it is the underlying object of the invention, starting from a connection pole of the kind known from WO 2014/198650 A1 for example, to develop this pole in such a way that, as the connection pole is pressed or molded into the battery cover, no capillary gaps or gaps in the μm range, in which acid or electrolyte can collect or through which acid or electrolyte can pass, arise between the connection pole and the material of the battery cover, in order in this way to be able to protect the connection pole effectively from corrosion, even without using a lubricant seal.

It is another object of the present invention to indicate a corresponding plastic battery cover or a corresponding battery housing as well as a lead-acid battery.

Accordingly, the invention relates, in particular, to a connection pole for a rechargeable battery, wherein the connection pole has a connection region for securing a pole terminal to the connection pole and a securing region for securing the connection pole to a housing part of the rechargeable battery.

The term "connection region" used herein shall be taken to mean that region of the connection pole which, in the installed state of the connection pole, i.e. when the connection pole has been pressed or molded into the battery cover or into the housing part of the rechargeable battery, is correspondingly exposed toward the outside in order to allow the attachment of a pole terminal.

In contrast, the term "securing region" should be taken to mean herein that region of the connection pole which, in the installed state of the connection pole, is pressed or molded into the material of the housing part of the rechargeable battery.

Like the connection pole known from WO 2014/198650 A1, the connection pole according to the invention has, in the securing region thereof, a corresponding anti-rotation safeguard, which is formed by a circumferential projection that has substantially an annular shape and is provided with a tooth system on its outer circumference. This anti-rotation safeguard (torque ring) is provided in an end region of the securing region facing the connection region of the connection pole.

The connection pole according to the invention is distinguished especially by the fact that, in the installed state, i.e. when the connection pole has been pressed or molded into a corresponding pole leadthrough in the housing part of the rechargeable battery, no capillary gaps or other gaps in the μm range between the components of the connection pole and the housing part material remain or occur in which acid or electrolyte can collect or through which acid or electrolyte can escape, thus ensuring leakage-free sealing between the connection pole and the housing part of the rechargeable battery, even without further sealing means.

For this purpose, it is envisaged in the case of the connection pole according to the invention that, in the end region of the securing region facing the connection region, more specifically between the anti-rotation safeguard, i.e. between the circumferential projection provided with the tooth system, and the connection region, a further circumferential sealing projection is provided, said further projection being of at least substantially circular-ring-shaped design and serving as a sealing projection. Through the provision of such a circumferential sealing projection of at least substantially circular-ring-shaped design above the anti-rotation safeguard, i.e. in a region between the anti-rotation safeguard and the connection region of the connection pole, the aim, namely that of ensuring that no capillary gaps or other gaps in the μm range between the components of the connection pole and the housing part material remain or arise, is made feasible. More specifically, it has been found that the provision of a sealing projection of this kind effectively prevents the formation of capillary gaps or other gaps between the components of the connection pole and the material of the rechargeable-battery housing part.

According to embodiments of the connection pole according to the invention, it is envisaged that the sealing projection, which is provided between the anti-rotation safeguard and the connection region of the connection pole, has an outer circumferential surface, in particular a circular-ring-shaped circumferential surface, which is formed without a tooth system. By means of this measure, it is possible, in particular, to ensure that, in a state in which the connection pole according to the invention is secured to the housing part of the rechargeable battery, i.e. when the connection pole has been pressed or molded into the housing part in a corresponding pole leadthrough, the sealing projection is completely covered by the material, in particular plastics material, of the housing part. In particular, this also applies to an upper circular ring surface of the circular-ring-shaped projection which faces the connection region of the connection pole. By virtue of the fact that the upper circular ring surface of the circular-ring-shaped projection is also completely covered by the material, in particular plastics material, of the housing part when the connection pole has been pressed or molded into the housing part of the rechargeable battery, the formation of gap regions or capillary gaps in which electrolyte or acid remains or through which electrolyte can escape can be effectively prevented.

In a preferred implementation of the last-mentioned embodiment, it is envisaged that the upper circular ring surface of the sealing projection is situated in a plane which is in or below the section plane between the connection region and the securing region, wherein—as already stated at the outset—the connection region defines that region of the connection pole which is exposed relative to the housing part in a state in which the connection pole is connected to the housing part of the rechargeable battery.

According to a first alternative of the connection pole according to the invention, it is envisaged that the sealing projection has a lower circular ring surface facing away from the connection region which is in a plane that corresponds to the plane in which an upper circular ring surface of the circumferential projection (anti-rotation safeguard) provided with the tooth system lies.

However, more effective sealing between the connection pole and the housing part of the rechargeable battery can be achieved if the lower circular ring surface of the sealing projection lies in a plane that extends parallel to and at a distance from the plane in which an upper circular ring surface of the circumferential projection provided with the tooth system lies.

In this context, it has proven particularly effective if a circular-ring-shaped under-cut region is provided between the circumferential projection (anti-rotation safeguard) provided with the tooth system and the sealing projection.

According to embodiments of the connection pole according to the invention, the undercut region has a length of 0.1 mm to 0.8 mm, preferably a length of 0.2 mm to 0.7 mm, and even more preferably a length of 0.3 mm to 0.5 mm, when viewed in the longitudinal direction of the connection pole.

In order to achieve even better in relation to the electrolyte highly susceptible to creep, it is envisaged, according to embodiments of the connection pole according to the invention, that the sealing projection has a circumferential surface which is preferably beveled in the direction of the circumferential projection (anti-rotation safeguard) provided with the tooth system.

As regards the anti-rotation safeguard of the connection pole according to the invention, it is envisaged that the tooth system of the circumferential projection has toothing in which preferably regularly radially projecting regions are formed when viewed in the circumferential direction of the projection. In this respect, it is envisaged, according to aspects of the present invention, that the radially projecting regions of the toothing project at least as far as and preferably further than the sealing projection, when viewed in the radial direction of the connection pole.

There is a trough-shaped region of the toothing between each two adjacent radially projecting regions of the toothing, said region projecting less far than the projecting regions of the toothing when viewed in the radial direction of the connection pole. As regards these trough-shaped regions of the toothing, it is envisaged that the circular projection preferably projects further than the respective trough regions of the toothing.

According to embodiments of the connection pole according to the invention, said connection pole has a labyrinth region in its securing region, and preferably in an end region of the securing region which lies opposite the connection region, wherein the outer wall of the connection pole has at least one circumferential projection in this labyrinth region. In this case, it is expedient if the circumference of the outer wall of the connection pole increases in a direction away from the connection region in at least one region of the labyrinth region which is not provided with a circumferential projection.

It is thereby possible to achieve smaller outer circumferences of the connection pole close to the connection region, i.e. in the upper region of the labyrinth region, thereby making it possible to reduce the quantity of material required for the connection pole in this region.

Thus, those wall regions in which no circumferential projection is arranged, either completely or partially, are taken to be the circumference of the outer wall of the connection pole in a region of the labyrinth region that is not provided with a circumferential projection. Consequently, these are wall regions of the outer wall in which no transitions to circumferential projections are provided either.

With the last-mentioned embodiment of the invention, it is thus possible, starting from the lower end of the connection pole, for the outer circumference to be reduced toward the connection region. It is thus possible, for example, to envisage enlarging the outer walls of the connection pole conically in a direction away from the connection region in at least one region of the labyrinth region outside the at least one circumferential projection. The outer circumference of the connection pole is thereby enlarged in an approximately linear manner in a direction away from the connection region in the at least one region of the labyrinth region outside the at least one circumferential projection.

As mentioned, a material saving can advantageously be achieved in the upper region of the labyrinth region by means of this embodiment of the connection pole. At the same time, sufficient mechanical stability of the connection pole can furthermore be ensured. The saving of the material of the connection pole, which is produced from lead for example, leads to a perceptible reduction in the weight of the connection pole and thus also of a rechargeable-battery housing provided with the connection pole. The saving of material is also advantageously associated with a saving of costs.

The outer wall of the connection pole advantageously extends conically or in the form of a hyperboloid of one sheet in at least one region, more specifically in a region in which the circumferential projection or circumferential projections are not arranged.

According to embodiments of the connection pole according to the invention, the at least one circumferential projection provided in the labyrinth region is also reduced in diameter. A further saving of material and weight is thereby obtained. It is also possible for a plurality of circumferential projections to be provided.

According to an advantageous development of the invention, it is envisaged that the circumference of the outer wall of the connection pole increases in a direction away from the connection region in the entire labyrinth region in the regions that are not provided with a circumferential projection. It is thereby possible to maximize the saving of material and hence the saving of weight.

According to an advantageous development of the invention, the labyrinth region has a shorter extent in the longitudinal direction of the connection pole than the securing section. This allows the provision of further elements in the securing section without compromising the labyrinth region.

The at least one circumferential projection of the labyrinth region can be implemented with different profiles. A ring-type shape may be mentioned as a basic shape for the circumferential projection. According to an advantageous development of the invention, the at least one circumferential projection has a hook-shaped profile. The hook-shaped region of the profile can follow on on the outside of a projection shaped in the manner of a ring in accordance with the abovementioned basic shape, for example. The hook-shaped profile supports the formation of a labyrinth between the material of the connection pole and the plastic of the surrounding housing in an effective manner. It is thereby possible to further improve the sealing effect of the labyrinth.

According to an advantageous development of the invention, the connection pole is internally hollow. The circumference of the inner wall of the connection pole increases in a direction away from the connection region in at least one first region of the labyrinth region. In an advantageous development of the invention, that region of the inner wall which increases in respect of its circumference can be designed to overlap with that region of the outer wall which increases in respect of its circumference. According to an advantageous development of the invention, the inner wall and the outer wall of the connection pole extend in parallel in the longitudinal direction thereof, at least in some section or sections. It is thereby possible to achieve constant wall thicknesses in the longitudinal direction of the connection pole, at least in some section or sections. Overall, the connection pole can thereby be optimized further in respect of material savings and weight. This development can be achieved, for example, if the angle formed by a conical region of the inner wall relative to the longitudinal axis of the connection pole is substantially equal to the angle of a conical section of the outer wall relative to the longitudinal axis of the connection pole.

According to an advantageous development of the invention, it is envisaged that the first region, in which the circumference of the inner wall increases, does not project in the longitudinal direction of the connection pole beyond the region in which the circumference of the outer wall increases. In particular, provision can be made for the first region, in which the circumference of the inner wall increases, to extend as far as the connection region.

According to an advantageous development of the invention, it is envisaged that the first region, in which the circumference of the inner wall increases, projects in the longitudinal direction of the connection pole beyond the region in which the circumference of the outer wall increases. This allows the provision of further specially shaped sections of the inner wall.

According to an advantageous development of the invention, it is envisaged that the connection pole is internally hollow, and the circumference of the inner wall of the connection pole increases in the direction of the labyrinth region in the connection region.

According to an advantageous development of the invention, it is envisaged that the circumference of the inner wall and/or of the outer wall increases in a monotonically linear or arcuate fashion. The increase in the circumference can thus take place with a linear contour, with the result that the inner wall and/or the outer wall extend conically, at least in some section or sections. It is also advantageously possible to provide an arcuate contour, e.g. with a hyperboloid shape. It is also advantageously possible to provide combined conical and arcuate sections on the connection pole at the inner wall and/or the outer wall.

In particular, the connection pole can be of rotationally symmetrical design. In this case, the previous statements in respect of the circumference of the inner wall or of the outer wall relate to the respective diameters thereof.

According to an advantageous development of the invention, the inner wall of the connection pole is enlarged conically in a direction away from the connection region in at least one second region of the labyrinth region. In the second region, the inner wall forms a larger angle relative to the longitudinal axis of the connection pole than in the first region. Such a stepwise enlargement of the cone angle allows the provision of inner regions of the connection pole with a graduated centering effect during the assembly of a rechargeable battery. The inner, hollow region of the connection pole is provided for the purpose of receiving a connection pin, which extends through the connection pole into the interior of the connection section. The connection pin is connected to electrode plate sets in the interior of the rechargeable battery. In the context of the production of a rechargeable battery, a housing bottom part is first of all provided with the electrode plate sets, on which connection pins are already mounted.

A cover of the rechargeable battery, in which connection poles are molded by injection molding, is then placed on the housing bottom part. In this case, simple and quick centering of the connection poles relative to the connection pins is the aim in order to allow quick and efficient production of the rechargeable battery. The conical inner sections simplify this centering.

Another advantage is that a lower mandrel for the internal sealing of the injection molding compound with respect to the environment can be positioned quickly in the second conical region during the production of the cover of the rechargeable battery.

According to an advantageous development of the invention, the second region is on the side of the first section facing away from the connection region.

According to an advantageous development of the invention, the circumference of the inner wall of the connection pole changes discontinuously at the end of the connection pole facing away from the connection region. Such a discontinuity causes an abrupt change in the inside diameter. It is thereby possible, for example, to implement an annular end section of the connection pole with an enlarged diameter relative to the first or the second region.

An advantageous rechargeable-battery housing or a part thereof has at least one connection pole of the type described above. The securing section of the at least one connection pole is advantageously embedded in a rechargeable-battery housing part by means of injection molding. The rechargeable-battery housing part can be the cover of the rechargeable battery, for example.

Exemplary embodiments of the connection pole according to the invention are described in greater detail below with reference to the attached drawings.

In the drawings:

FIGS. 1a, 1b each show isometric views of a first exemplary embodiment of the connection pole according to the invention;

In the figures, the same reference signs are used for corresponding elements and components.

Figure 1A:
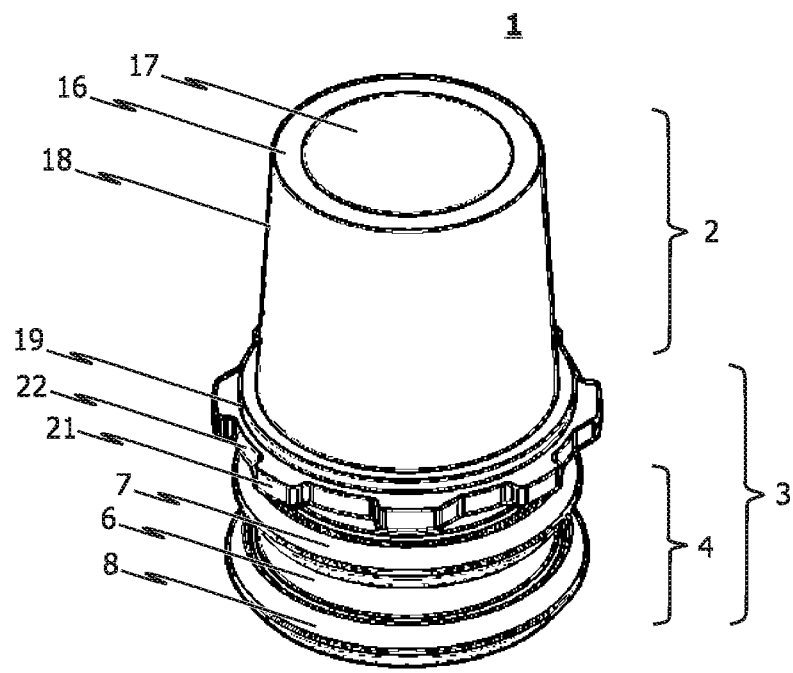
Figure 1B:
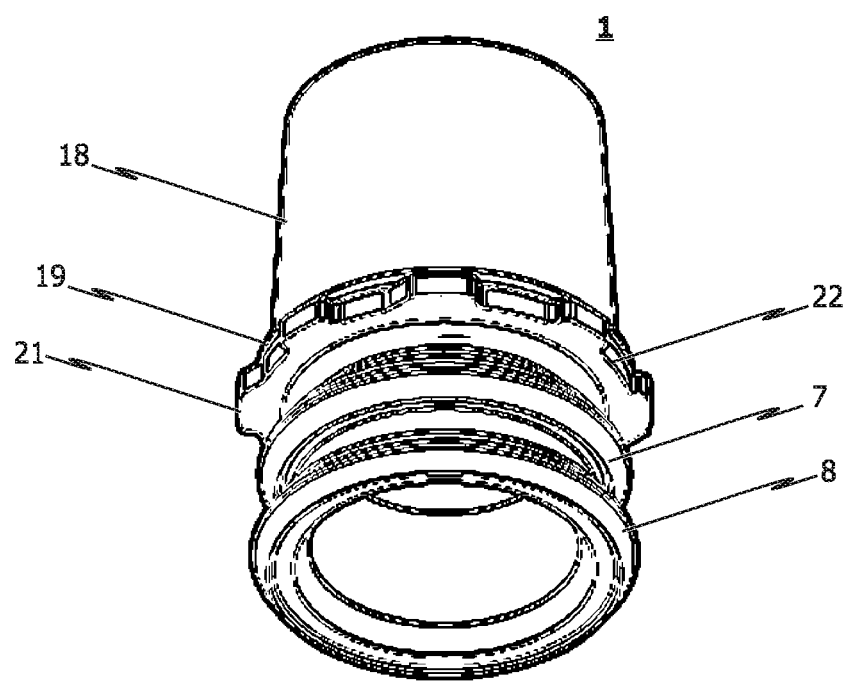

The connection pole 1 according to the invention is described below with reference to the drawings of the exemplary embodiments. More specifically, FIGS. 1a and 1b each show a first exemplary embodiment of the connection pole 1 according to the invention in an isometric view, the connection pole being shown once again schematically in side view in FIG. 2 and schematically in a longitudinal section in FIG. 3.

Figure 4:
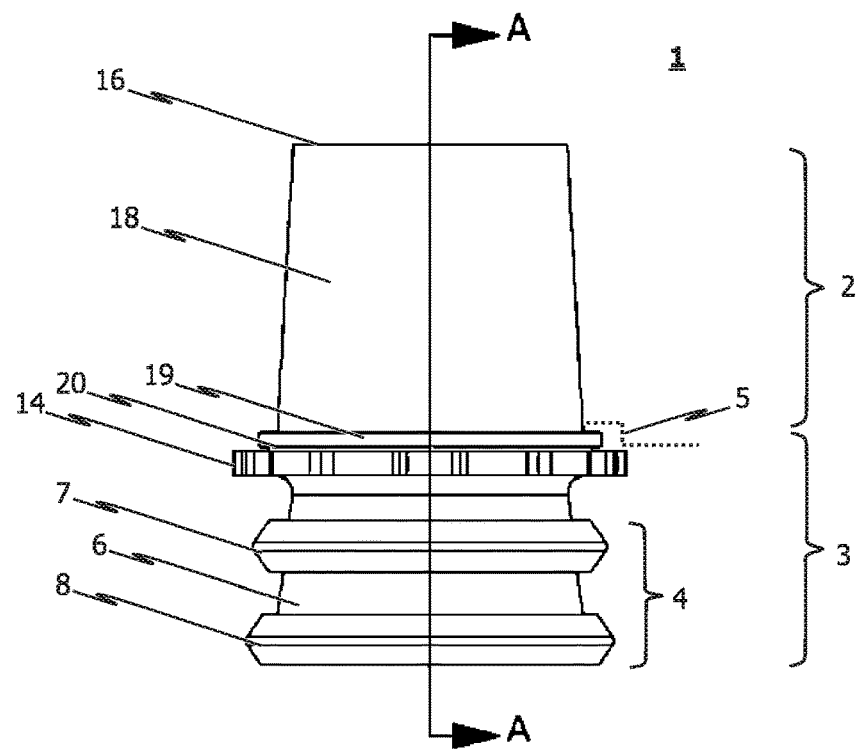
FIG. 4 shows schematically a side view of a modification of the connection pole according to the first exemplary embodiment.

FIG. 4 shows schematically, in a side view, a modification of the connection pole 1 according to the first exemplary embodiment. Said modified embodiment is illustrated schematically in FIG. 5, once again in a longitudinal section.

The connection pole 1 according to the first exemplary embodiment has a connection region 2 and a securing region 3. Moreover, a labyrinth region 4 is provided.

In the connection region 2, on its outside, the connection pole 1 has an outer wall 18 and an upper end surface 16. Arranged on the outside of the connection pole 1, in the securing region 3, adjoining the connection region 2, is a circumferential projection 14, which can fundamentally have approximately a ring shape and serves as an anti-rotation safeguard. For this purpose, the circumferential projection 14 has the tooth system explained in greater detail below on the outer circumference. Adjoining the circumferential projection 14 (anti-rotation safeguard) is an outer wall 6 on the outside of the connection pole 1, said wall being arranged in the labyrinth region 4. The outer wall 6 is interrupted by circumferential projections 7, 8, which each have a hook-shaped profile. Apart from the tooth system, the connection pole 1 can be designed as a substantially rotationally symmetrical component, for example.

Figure 2:
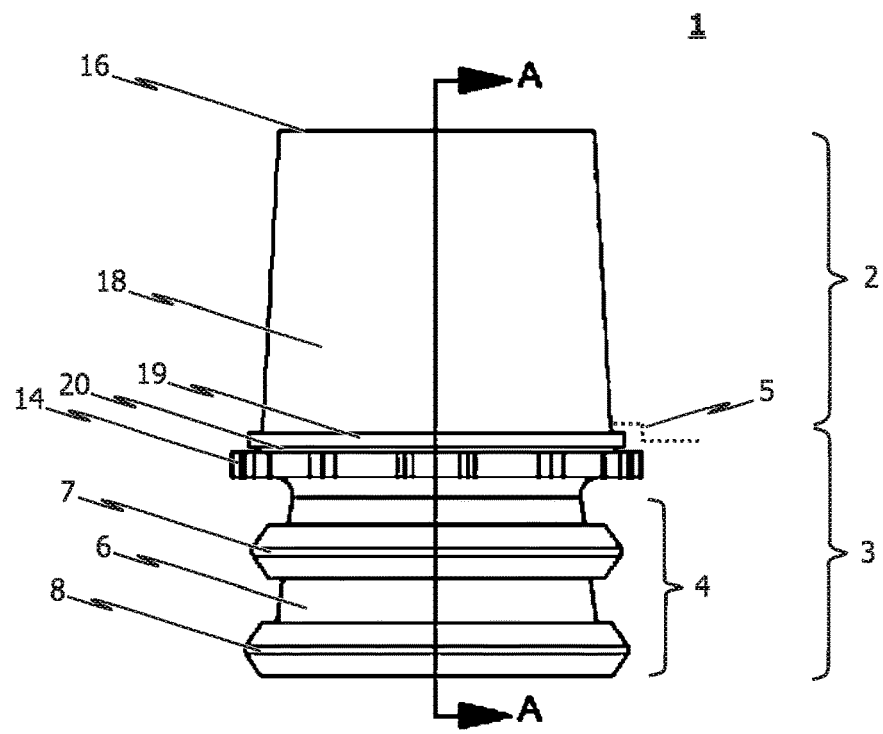
FIG. 2 shows schematically a side view of the connection pole according to the first exemplary embodiment.

In the left-hand region of the connection pole 1 by way of example, FIG. 2 shows a segment of a rechargeable-battery housing part 5 molded onto the connection pole 1 by injection molding. As is apparent, the connection pole 1 is embedded in the material of the housing part 5 on its outside, in the securing region 3. The circumferential projections 7, 8, 14 form a labyrinth, which ensures good sealing of the interior of the rechargeable battery with respect to the environment.

The connection pole 1 is of hollow design. In a cavity 17 formed in the connection pole 1, sections of an inner wall 9 extend conically with different angles of the inner wall 9 relative to the longitudinal axis L of the connection pole 1. In the labyrinth region 4, a first region 10 of the conically extending inner wall 9 and a second region 11 are illustrated. The second region 11 is adjoined by a first region 10 on the opposite side of the connection pole 1 from the connection region 2. A further conically extending region 15 of the inner wall 9, which extends from the upper end surface 16 into the labyrinth region, is provided on the other side of the first region 10.

Adjoining the second region 11 is an approximately annular region 13 in the cavity 17. In this case, the diameter of the cavity 17 is enlarged abruptly at the location denoted by the reference sign "12".

The circumferential projection 14 serving as an anti-rotation safeguard has an outer tooth system, which is formed by corresponding radially projecting regions 21 (teeth). A trough-shaped region 22 is situated between each two adjacent radially projecting regions 21 (teeth) of the toothing. The toothing formed by the radially projecting regions 21 and the trough-shaped regions 22 provides an anti-rotation safeguard of the connection pole 1 in the plastics material of the rechargeable-battery housing part 5.

In the exemplary embodiments of the connection pole according to the invention which are illustrated in the drawings, provision is made for a multiplicity of radially projecting regions 21 (teeth) to be arranged in a manner uniformly distributed over the circumference of the connection pole 1. In this context, it is advantageous if the radially projecting regions 21 are provided with asymmetrical tooth flanks. As can be seen from the isometric illustrations in FIG. 1a and FIG. 1b, a first tooth flank of a radially projecting region 21 has a smaller angle in relation to the outer circumference of the circumferential projection 14 than the second tooth flank belonging to the radially projecting region 21. Tooth flanks formed with a smaller angle create the possibility of producing the connection pole 1 by means of a jaw-type mold. During demolding, however, the jaws can be readily separated from the connection pole 1 since no undercut is formed in the parting direction.

Figure 5:
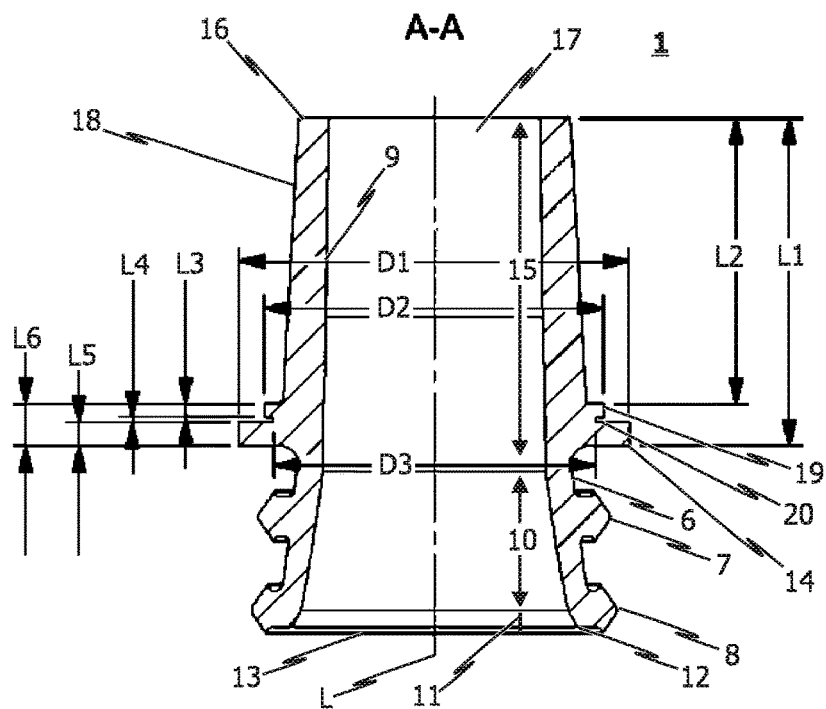
FIG. 5 shows schematically a longitudinal section through the modification of the connection pole shown in FIG. 4.

The first exemplary embodiment of the connection pole 1 according to the invention which is illustrated in the drawings as well as the modified embodiment shown in FIGS. 4 and 5 are distinguished especially by the fact that a further circumferential projection 19, which is at least substantially of circular-ring-shaped design, is provided between the circumferential projection 14, which is provided with the tooth system and serves as an anti-rotation safeguard, and the connection region 2 in the end region of the securing region 3 facing the connection region 2 of the connection pole 1. This further circumferential projection 19 is used to effectively prevent the formation of any gaps between the connection pole 1 and the material of the housing part of the rechargeable battery in order in this way to allow acid to remain in the gaps and, in particular, also to allow highly effective leakage-free sealing.

As can be seen from the illustration in FIG. 2, the sealing projection 19 is arranged and embodied in such a way that it is covered, preferably over the entire area, by the material, in particular plastics material, of the housing part 5 in a state in which the connection pole 1 is secured to the housing part 5 of the rechargeable battery. In this context, "covered over the entire area" means that, in particular, the upper circular ring surface of the sealing projection 19 facing the connection region 2 of the connection pole 1 is also covered by the material, in particular plastics material, of the housing part 5. To this extent, the upper circular ring surface of the circular-ring-shaped sealing projection 19 is situated in a plane which is in or below the section plane between the connection region 2 and the securing region 3, wherein the connection region 2 defines that region of the connection pole 1 which is exposed relative to the housing part 5 in a state during which the connection pole 1 is connected to the housing part 5 of the rechargeable battery.

In the exemplary embodiments of the connection pole 1 according to the invention which are illustrated in the drawings, the circular-ring-shaped sealing projection has an outer circumferential surface which is, in particular, circular-ring-shaped and which is preferably formed without a tooth system since, in the illustrated exemplary embodiments of the connection pole 1 according to the invention, the sealing projection 19 has only the function of reliable sealing but not the function of safeguarding against rotation.

It can furthermore be seen from the drawings that the circumferential projection 14 provided with the tooth system (anti-rotation safeguard) has an upper circular ring surface facing the sealing projection 19 which is in a plane that extends parallel to the plane in which the upper circular ring surface of the circular-ring-shaped sealing projection 19 lies.

In the first exemplary embodiment of the connection pole 1 according to the invention, as illustrated with a modification in the drawings according to FIGS. 1 to 5, the circular-ring-shaped sealing projection 19 has a lower circular ring surface which faces the connection region 2 of the connection pole 1 and which lies in a plane that extends parallel to and at a distance from the plane in which the upper circular ring surface of the circumferential projection 14 provided with the tooth system lies. Nevertheless, the circular-ring-shaped sealing projection 19 directly adjoins the circumferential projection 14 provided with the tooth system. In other words, no further projection is provided between the sealing projection 19 and the projection 14.

In particular, it can be seen from the illustrations in FIGS. 2, 3, 4 and 5 that a circular-ring-shaped undercut region 21 is provided between the sealing projection 19 and the projection 14.

Leakage-free sealing can be achieved in an effective manner especially when the circular sealing projection 19 projects further than the respective trough-shaped regions 22 of the toothing of the projection 14 when viewed in the radial direction of the connection pole 1. In this case, however, it is not necessary for the circular-ring-shaped sealing projection 19 also to project further in the radial direction than the radially projecting regions of the toothing of the projection 14.

Figure 3:
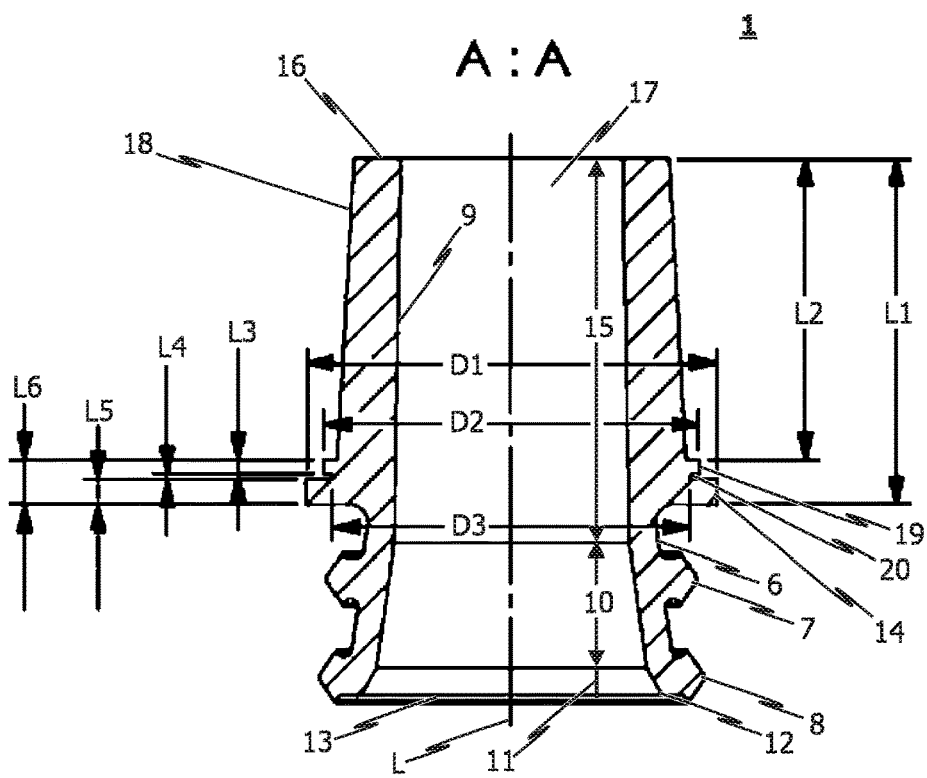
FIG. 3 shows schematically a longitudinal section through the connection pole according to the first exemplary embodiment.

Preferred dimensions of the diameters and lengths entered in FIG. 3 for the connection pole 1 shown there are given below:

| | | |
|---|---|---|
| D1: 21-22 mm | L1: 18.35-20.35 mm | L4: 0.2-0.4 mm |
| D2: 20-22 mm | L2: 15.85-17.58 mm | L5: 0.4-2.4 mm |
| D3: 19-21 mm | L3: 0.7-0.9 mm | L6: 1.5-3.5 mm |

Preferred dimensions of the diameters and lengths entered in FIG. 5 for the connection pole 1 shown there are given below:

| | | |
|---|---|---|
| D1: 21-22 mm | L1: 18.35-20.35 mm | L4: 0.2-0.4 mm |
| D2: 19-21 mm | L2: 15.85-17.58 mm | L5: 0.4-2.4 mm |
| D3: 18-20 mm | L3: 0.7-0.9 mm | L6: 1.5-3.5 mm |

Figure 6:
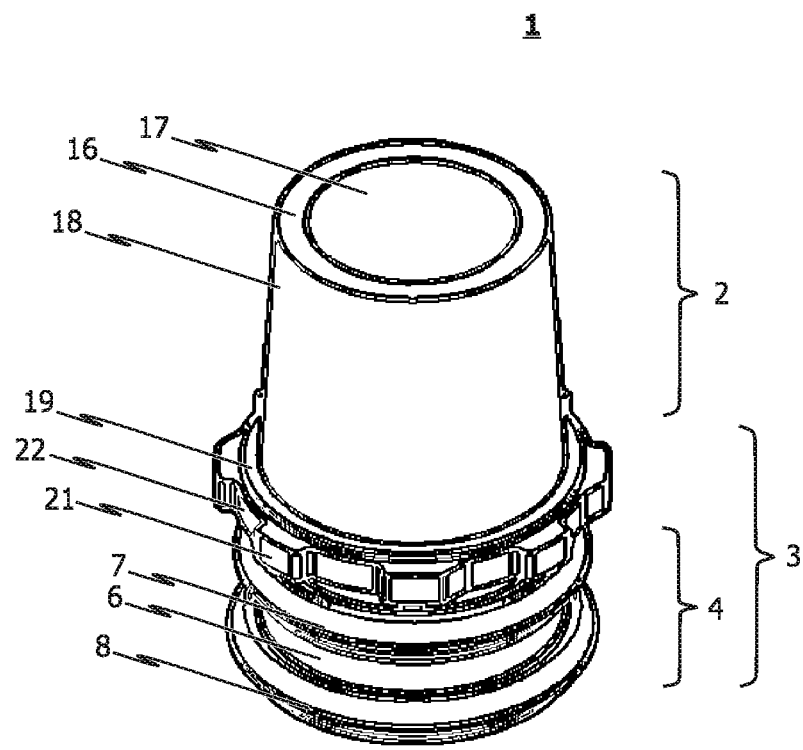
FIG. 6 shows an isometric view of a second exemplary embodiment of the connection pole according to the invention.
Figure 7:
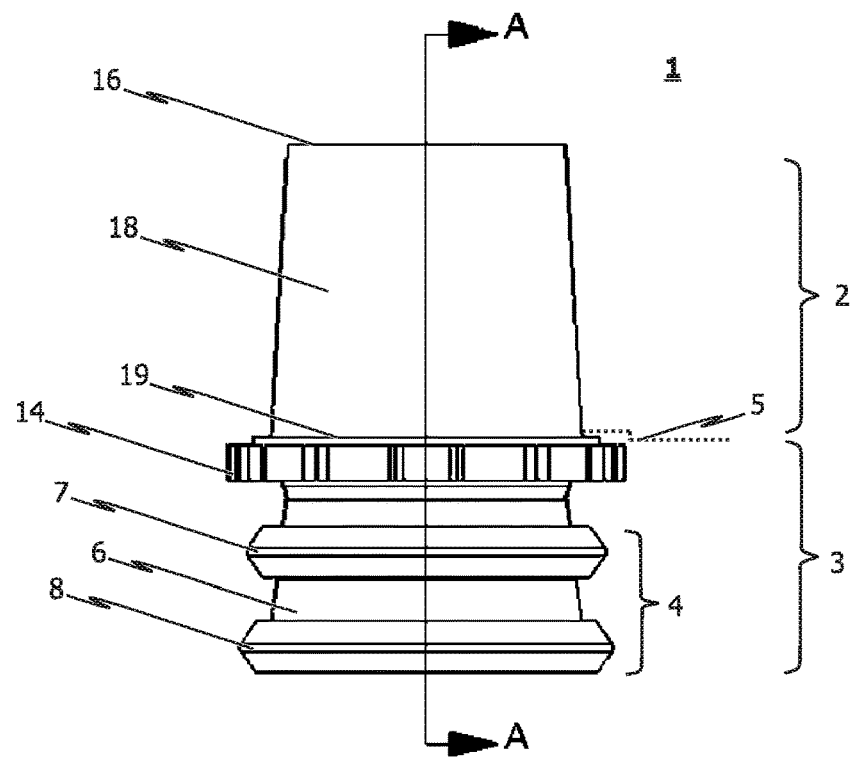
FIG. 7 shows schematically a side view of the connection pole according to the second exemplary embodiment.

FIG. 6 shows an isometric view of a second exemplary embodiment of the connection pole 1 according to the invention. Said second exemplary embodiment is illustrated schematically in a side view in FIG. 7 and once again schematically in a longitudinal section in FIG. 8.

Structurally and functionally, the connection pole 1 corresponds substantially to the connection pole according to the first exemplary embodiment, and therefore only differences between these two embodiments are explored below in order to avoid unnecessary repetitions. More specifically, in the case of the connection pole 1 according to the second exemplary embodiment, it is envisaged that—in contrast to the first exemplary embodiment—the circular-ring-shaped sealing projection 19 has a lower circular ring surface facing away from the connection region 2 which lies in a plane that corresponds to the plane in which the upper circular ring surface of the circumferential projection 14 provided with the tooth system also lies. In other words, no undercut is provided between the sealing projection 19 and the projection 14 serving as an anti-rotation safeguard in the second exemplary embodiment of the connection pole 1 according to the invention.

Figure 8:
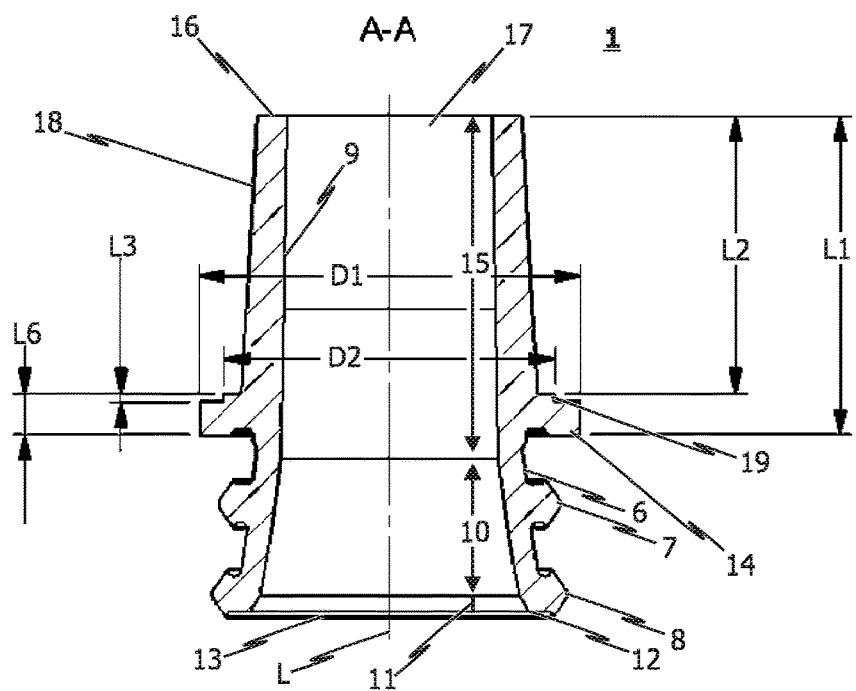
FIG. 8 shows schematically a longitudinal section through the connection pole according to the second exemplary embodiment.

Preferred dimensions of the diameters and lengths entered in FIG. 8 for the connection pole 1 shown there are given below:

| | | |
|---|---|---|
| D1: 22-24 mm | L1: 18.35-20.35 mm | L3: 0.4-0.6 mm |
| D2: 19-21 mm | L2: 15.85-17.58 mm | L6: 1.5-3.5 mm |

The previously described embodiments of the connection pole 1 each have linear profiles in the longitudinal direction, i.e. corresponding conical sections or regions. However, embodiments of a connection pole 1 in which an arcuate shape of the inner wall 9 and of the outer wall 6 in the securing region 3 is selected are also conceivable in this context.

The invention is not restricted to the exemplary embodiments shown in the drawings but can be obtained from a combination of all the features disclosed herein.

The invention claimed is:

1. A connection pole, having a longitudinal direction and a radial direction, for a rechargeable battery, the connection pole comprising:
   a connection region for securing a pole terminal to the connection pole;
   a securing region for securing the connection pole to a housing part of the rechargeable battery, the securing region having an end region facing the connection region, the end region comprising:
      a circumferential projection, the circumferential projection having at least substantially an annular shape,
      a respective upper circular ring surface of the circumferential projection facing the connection region, and a tooth system projecting from an outer circumference of the circumferential projection as a connection pole rotation limiter, wherein the tooth system has toothing in which regularly radially projecting regions are formed, the radially projecting regions extending radially from the outer circumference of the circumferential projection a circumferential sealing projection, the circumferential sealing projection having an at least substantially circular-ring shape, a respective upper circular ring surface of the circumferential sealing projection facing the connection region, and a lower circular ring surface facing away from the connection region, the circumferential sealing projection positioned in the end region between the circumferential projection and the connection region;

a circular-ring-shaped undercut region provided between the circumferential projection and the circumferential sealing projection; and a labyrinth region formed in the end region, wherein an outer wall of the connection pole, having a circumference, has at least one additional circumferential projection in the labyrinth region, wherein the lower circular ring surface of the circumferential sealing projection faces the at least one additional circumferential projection in the labyrinth region, wherein the respective upper circular ring surface of the circumferential sealing projection is covered from an external environment by the housing part where the connection region is positioned proximate to the housing part, each of the housing part and the upper circular ring surface of the circumferential sealing projection extending coplanar along a first plane which is below a section plane between the connection region and the securing region;

wherein the respective upper circular ring surface of the circumferential projection extends along a second plane that extends parallel to the first plane;

wherein the lower circular ring surface of the circumferential sealing projection extends along a third plane that extends parallel to and at a distance from the second plane;

wherein the circular-ring-shaped undercut region is provided between the second plane and the third plane and beneath the first plane;

wherein the circular-ring-shaped undercut region has a length of 0.3 mm to 0.5 mm, when viewed in the longitudinal direction of the connection pole;

wherein the circumferential projection and the tooth system together have a length of 0.4 mm to 2.4 mm, when viewed in the longitudinal direction of the connection pole; and wherein the circumference of the outer wall of the connection pole increases in a direction away from the connection region in at least one region of the labyrinth region which is not provided with the at least one additional circumferential projection.

2. The connection pole as claimed in claim 1, wherein the connection region defines that region of the connection pole which is exposed relative to the housing part in a state in which the connection pole is connected to the housing part.

3. The connection pole as claimed in claim 1, wherein the circumferential sealing projection has a circumferential surface which is beveled in a direction of the circumferential projection provided with the tooth system.

4. The connection pole as claimed in claim 1, wherein the radially projecting regions of the toothing project at least as far as the circumferential sealing projection, when viewed in the radial direction of the connection pole.

5. The connection pole as claimed in claim 4, wherein there is a trough-shaped region of the toothing between each two adjacent radially projecting regions of the toothing, the trough-shaped region projecting a trough region distance less than the projecting regions of the toothing when viewed in the radial direction of the connection pole, wherein the circumferential sealing projection projects further than the respective trough-shaped regions of the toothing.

6. The connection pole as claimed in claim 1, wherein the circumferential projection provided with the tooth system has a first length, and the circumferential sealing projection has a second length, in each case when viewed in the longitudinal direction of the connection pole, wherein the first length is greater than the second length.

7. The connection pole as claimed in claim 6, wherein the first length is in a range between 0.5 and 4.0 mm.

8. The connection pole as claimed in claim 1, wherein the labyrinth region has a shorter extent in the longitudinal direction of the connection pole than the securing region.

9. The connection pole as claimed in claim 1, wherein the at least one additional circumferential projection of the labyrinth region has a hook-shaped profile.

10. The connection pole as claimed in claim 1, wherein the connection pole is internally hollow, and an inner wall circumference of an inner wall of the connection pole increases in the direction away from the connection region in at least one first section of the labyrinth region.

11. The connection pole as claimed in claim 10, wherein the inner wall and the outer wall of the connection pole extend in parallel in the longitudinal direction thereof, at least in some region or regions.

12. The connection pole as claimed in claim 10, wherein the first section, in which the inner wall circumference increases, does not project in the longitudinal direction of the connection pole beyond a section in which the circumference of the outer wall increases.

13. The connection pole as claimed in claim 10, wherein the inner wall circumference of the connection pole increases in a direction of the labyrinth region in the connection region.

14. The connection pole as claimed in claim 10, wherein at least one of the inner wall circumference of the connection pole and the circumference of the outer wall of the connection pole increases in a monotonically linear or arcuate fashion.

15. The connection pole as claimed in claim 14, wherein the arcuate increase in the circumference of the connection pole is progressive in the direction away from the connection region.

16. A rechargeable-battery housing or part thereof, having at least one connection pole as claimed in claim 1, wherein the at least one connection pole is embedded in the securing region thereof in a rechargeable-battery housing part by means of injection molding technology.

17. A rechargeable battery thereof, having a rechargeable-battery housing as claimed in claim 16.

18. The connection pole as claimed in claim 1, wherein the circumferential sealing projection has a circular-ring-shaped outer circumferential surface which is formed without the tooth system.

19. The connection pole as claimed in claim 1, wherein the outer circumference of the circumferential projection has a diameter, and an outer circumference of the circumferential sealing projection has a second diameter being greater than the diameter of the circumferential projection.

* * * * *